(12) United States Patent
Nishiumi et al.

(10) Patent No.: US 10,300,788 B2
(45) Date of Patent: May 28, 2019

(54) VEHICLE WITH IMPROVED SUPPRESSION OF HIGH VOLTAGE UNDER COLLISION LOAD

(71) Applicant: TOYOTA JIDOSHA KABUSHIKI KAISHA, Toyota-shi (JP)

(72) Inventors: Daiki Nishiumi, Okazaki (JP);
Masanori Miyakawa, Yamato (JP);
Keijiro Ohshima, Toyota (JP);
Nobuhito Mori, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/906,735

(22) Filed: Feb. 27, 2018

(65) Prior Publication Data

US 2018/0251023 A1 Sep. 6, 2018

(30) Foreign Application Priority Data

Mar. 1, 2017 (JP) .................................. 2017-038297

(51) Int. Cl.
*B60K 1/04* (2019.01)
*B60K 15/067* (2006.01)
(Continued)

(52) U.S. Cl.
CPC .............. *B60K 15/067* (2013.01); *B60K 1/04* (2013.01); *B60K 7/0007* (2013.01); *B60K 15/03006* (2013.01); *B60K 15/07* (2013.01); *B60L 50/66* (2019.02); *B60L 50/71* (2019.02); *B60K 2001/001* (2013.01);
(Continued)

(58) Field of Classification Search
CPC ........ B60K 15/067; B60K 1/04; B60K 15/07; B60K 7/0007; B60K 15/03006; B60K 2015/0638; B60K 2001/0411; B60K 2001/0416; B60K 2015/0637; B60K 2015/0675; B60K 2001/001; B60K 2015/03315; B60L 50/71; B60L 50/66; B60Y 2306/01
See application file for complete search history.

(56) References Cited

U.S. PATENT DOCUMENTS 5,476,151 A * 12/1995 Tsuchida .................. B60K 1/00
180/274
7,066,515 B2 * 6/2006 Pierce ..................... B60R 19/00
180/68.5
(Continued)

FOREIGN PATENT DOCUMENTS

WO 2015/0185184 A1 12/2015

*Primary Examiner* — Jacob B Meyer
(74) *Attorney, Agent, or Firm* — Oblon, McClelland, Maier & Neustadt, L.L.P.

(57) ABSTRACT

A vehicle includes an electrical device in which a high-voltage part is disposed within a case, and a fuel tank. The high-voltage part is disposed near a first side end of the case in a vehicle width direction. The fuel tank has a first end portion in the vehicle width direction and a second end portion opposite to the first end portion. When a collision load equal to or greater than a predetermined value is applied to the fuel tank from the outside in a vehicle front-rear direction, the fuel tank is configured to be horizontally rotated about the first end portion of the fuel tank, and the second end portion of the fuel tank is configured to contact the second side end of the electrical device.

11 Claims, 8 Drawing Sheets

(51) Int. Cl.
   *B60K 7/00*      (2006.01)
   *B60K 15/03*     (2006.01)
   *B60K 15/07*     (2006.01)
   *B60L 50/60*     (2019.01)
   *B60L 50/71*     (2019.01)
   *B60K 1/00*      (2006.01)
   *B60K 15/063*    (2006.01)

(52) U.S. Cl.
   CPC ............... *B60K 2001/0411* (2013.01); *B60K 2001/0416* (2013.01); *B60K 2015/03315* (2013.01); *B60K 2015/0637* (2013.01); *B60K 2015/0638* (2013.01); *B60K 2015/0675* (2013.01); *B60Y 2306/01* (2013.01)

(56) References Cited

U.S. PATENT DOCUMENTS

| | | | | |
|---|---|---|---|---|
| 7,717,207 B2* | 5/2010 | Watanabe | ................ | B60K 1/04 180/274 |
| 7,921,951 B2* | 4/2011 | Watanabe | ................ | B60K 1/04 180/68.5 |
| 8,051,934 B2* | 11/2011 | Kiya | ................ | B60K 1/04 180/274 |
| 9,090,218 B2* | 7/2015 | Karashima | ................ | B60K 1/04 |
| 9,444,082 B2* | 9/2016 | Tsujimura | ........... | H01M 2/1077 |
| 9,963,028 B1* | 5/2018 | Pachore | ................ | B60K 1/04 |
| 10,150,357 B2* | 12/2018 | Landgraf | ............ | B60L 11/1887 |
| 2007/0215399 A1* | 9/2007 | Watanabe | ................ | B60K 1/04 180/68.5 |
| 2009/0226806 A1* | 9/2009 | Kiya | ................ | B60K 1/04 429/186 |
| 2013/0026786 A1* | 1/2013 | Saeki | ................ | B60K 1/04 296/187.12 |
| 2013/0270862 A1* | 10/2013 | Hotta | ................ | B62D 21/155 296/187.09 |
| 2016/0121933 A1* | 5/2016 | Ohmura | ................ | B60K 5/04 180/297 |
| 2017/0120738 A1* | 5/2017 | Landgraf | ............ | B60L 11/1887 |
| 2018/0201125 A1* | 7/2018 | Mori | ................ | B60K 1/04 |
| 2018/0251023 A1* | 9/2018 | Nishiumi | ............ | B60L 11/1877 |
| 2018/0297461 A1* | 10/2018 | Tambo | ................ | B60K 1/04 |

\* cited by examiner

VEHICLE WITH IMPROVED SUPPRESSION OF HIGH VOLTAGE UNDER COLLISION LOAD

INCORPORATION BY REFERENCE

The disclosure of Japanese Patent Application No. 2017-038297 filed on Mar. 1, 2017 including the specification, drawings and abstract is incorporated herein by reference in its entirety.

BACKGROUND

The present application relates to a vehicle in which an electrical device having a high-voltage part accommodated in a case, is disposed at a vehicle front portion or a vehicle rear portion.

In the related art, in vehicles, such as automobiles, various electrical devices having a high-voltage part accommodated in a case are mounted. The various electrical devices include, for example, a battery unit in which a battery serving as a cell is accommodated in a battery case, a power control unit in which a converter or an inverter is accommodated in the case, a fuel cell in which a cell stack is accommodated in the case, and a motor drive unit in which a motor serving as a driving source is accommodated in the case.

Additionally, in the vehicles, such as automobiles, various fuel tanks in which fuel gas is stored are also mounted. The various fuel tanks include, for example, a tank that stores compressed natural gas in a natural gas vehicle, a tank that stores hydrogen gas in a hydrogen car, and a tank that stores the fuel gas to be supplied to a fuel cell in a fuel cell vehicle.

In this way, regarding positional relationships between the above-described electrical devices and the above-described fuel tanks, various layouts have been suggested in the related art.

For example, International Publication WO2015/185184 (particularly FIG. 4) discloses a fuel cell vehicle in which a motor drive unit is disposed at a vehicle rear portion so as to extend over rear wheel vehicle axles. Two fuel tanks are disposed in front of and behind the motor drive unit, respectively, such that their longitudinal directions are oriented along a vehicle width direction (i.e., perpendicular to a vehicle longitudinal direction).

BRIEF SUMMARY

In fuel cell vehicles in which a fuel tank is disposed rearward of the motor drive unit as in International Publication WO2015/185184, at the time of a rear collision, a collision load can be received by the fuel tank, which generally comprises a high-strength component, before being received by the motor drive unit. However, there is a possibility that the motor drive unit may be damaged because the fuel tank is pushed forward due to the collision and may impact the motor drive unit.

When a case is damaged in this way, a high-voltage part (for example, a motor, a terminal portion, or the like) within the motor drive unit that was originally protected with a coating or a cover in order to prevent an electric shock or the like may be peeled off (exposes). A state where the high-voltage part can be touched may occur. In addition, there is a possibility that the exposed high-voltage part may be damaged by contacting a peripheral component.

The exposure of the high-voltage part as described above is not limited to the layout disclosed in International Publication WO2015/185184, and may occur, for example, even during a front collision in a fuel cell vehicle in which a fuel tank is disposed in front of the motor drive unit provided in the vehicle front portion. Additionally, the above described exposure is not limited to the fuel cell vehicle, and is also applicable to, for example, a front collision (or a rear collision) in other vehicles in which fuel tanks are disposed in front of (or behind) an electrical device, such as a battery unit, which is provided in the vehicle front portion (or vehicle rear portion).

The present disclosure provides a technique for further reducing the exposure of a high-voltage part following a front collision or a rear collision, in a vehicle having an electrical device in which the high-voltage part is accommodated in a case is disposed at a vehicle front portion or a vehicle rear portion and a fuel tank is disposed outward of the electrical device in a vehicle front-rear direction.

In the vehicle according to aspects of the disclosure, displacement of the fuel tank during a front collision or a rear collision is controlled so that the fuel tank does not contact a peripheral part of the high-voltage part in the electrical device.

Aspects of the disclosure relate to a vehicle including an electrical device in which a high-voltage part is accommodated in a case, and a fuel tank in which fuel (e.g., gaseous fuel) is stored. The electrical device is disposed at a vehicle front portion or a vehicle rear portion. The case has a first side end in a vehicle width direction and a second side end opposite to the first side end. The fuel tank is disposed outward of the electrical device in a vehicle front-rear direction so as to extend in the vehicle width direction.

The high-voltage part is disposed near the first side end of the case in the vehicle width direction within the case. The fuel tank has a first end portion in the vehicle width direction and a second end portion opposite to the first end portion. When a collision load equal to or more than a predetermined value is applied to the fuel tank from the outside in the vehicle front-rear direction, the fuel tank is configured to horizontally rotated around the first end portion of the fuel tank in the vehicle width direction, and the second end portion of the fuel tank in the vehicle width direction is configured to contact the second side end of the electrical device in the vehicle width direction.

In aspects of the disclosure, the expression "outward in a vehicle front-rear direction" refers to a position toward a front side or a rear side relative to the given positional reference, while a position toward a vehicle central portion in the vehicle front-rear direction relative to the given positional reference is defined as "inside". Therefore, according to aspects of the disclosure, the expression "outward of the electrical device in the vehicle front-rear direction" refers to the front side in the vehicle front-rear direction when the electrical device is disposed at the vehicle front portion, and refers to the rear side in the vehicle front-rear direction when the electrical device is disposed at the vehicle rear portion.

According to aspects of the disclosure, the expression "horizontally rotated" means rotation around a vertical axis, and means that, for example, the horizontally rotated fuel tank rotates in a clockwise or counterclockwise direction in a plan view.

According to aspects of the disclosure, during a front collision or a rear collision, the fuel tank, which is generally made of a high-strength component, receives a collision load before the electrical device. Therefore, exposure of the high-voltage part can be suppressed by further restraining the electrical device from being damaged due to a relatively large collision load in the early stages of a collision.

Additionally, when a collision load equal to or greater than a predetermined value is applied to the fuel tank from the outside in the vehicle front-rear direction, the fuel tank is configured to be horizontally rotated with the first end portion of the fuel tank in the vehicle width direction forming the axis of rotation. Therefore, the second end portion of the horizontally rotated fuel tank in the vehicle width direction contacts the second side end of the electrical device in the vehicle width direction, and thereby impact is absorbed. Here, the high-voltage part is disposed near the first side end of the case in the vehicle width direction within the case. Therefore, exposure of the high-voltage part can be further limited or reduced even when the second side end of the electrical device (for example, the case) in the vehicle width direction is damaged.

In other words, according to aspects of the disclosure, when a collision load equal to or greater than a predetermined value is applied to the fuel tank, the fuel tank is horizontally rotated about the end portion near the high-voltage part, and the fuel tank is caused to contact a part of the electrical device away from the high-voltage part. Accordingly, at least a peripheral part of the high-voltage part is further restrained from being damaged, and thus the exposure of the high-voltage part is further limited or suppressed.

Next, a configuration example in which the fuel tank is horizontally rotated around the first end portion in the vehicle width direction when a collision load equal to or greater than a predetermined value is applied to the fuel tank from the outside in the vehicle front-rear direction will be described.

The vehicle according aspects of the disclosure may further include a first supporting portion and a second supporting portion respectively provided at the first end portion and the second end portion of the fuel tank in the vehicle width direction. The first supporting portion and the second supporting portion may be configured to support the fuel tank with respect to a vehicle body while allowing displacement of the fuel tank. The first supporting portion that supports the first end portion of the fuel tank in the vehicle width direction may be stronger (i.e., harder to break) than the second supporting portion that supports the second end portion of the fuel tank in the vehicle width direction, with respect to a collision load.

According to aspects of the disclosure, the expression "supporting the fuel tank with respect to the vehicle body while allowing displacement of the fuel tank" means a flexible supporting aspect in which the fuel tank is not rigidly fixed to the vehicle body, and for example, a certain amount of displacement in the vehicle front-rear direction, for example, as a result of mounting by suspended support by supporting bands, or elastic support by vibration-proof mounts having elastic (e.g., from rubber) bodies, is allowed.

According to the aspect of the disclosure, the first supporting portion is configured to be stronger (i.e., harder to break) than the second supporting portion when acted upon by a collision load. Therefore, even when a collision load equal to or greater than a predetermined value is applied to the fuel tank and the second supporting portion breaks, the first supporting portion that does not break can support the first end portion of the fuel tank in the vehicle width direction while allowing displacement of the fuel tank. Accordingly, the second end portion of the fuel tank in the vehicle width direction can be made to contact a part located away from the high-voltage part in the electrical device by horizontally rotating the fuel tank about the first end portion.

The vehicle according aspects of the disclosure may further include a pair of rear side members extending in a vehicle front-rear direction at both end portions of the vehicle in the vehicle width direction; and a pair of brackets connected to the rear side members, respectively. The first supporting portion and the second supporting portion may be supporting bands, each supporting band having an upper end coupled to a corresponding bracket out of the brackets and a lower end coupled to the fuel tank.

The vehicle according to aspects of the disclosure may further include a bracing member that couples the first end portion of the fuel tank in the vehicle width direction and a peripheral component disposed inward of the fuel tank in the vehicle front-rear direction together.

According to aspects of the disclosure, even when a collision load equal to or greater than a predetermined value is applied to the fuel tank, and for example, both the first supporting portion and the second supporting portion that support the first end portion and the second end portion of the fuel tank in the vehicle width direction, respectively, break, the first end portion of the fuel tank in the vehicle width direction is not displaced because the bracing member functions as a stopper, whereas the second end portion of the fuel tank in the vehicle width direction that is a free end is displaced inward in the vehicle front-rear direction. Accordingly, the fuel tank can be horizontally rotated around the first end portion in the vehicle width direction when a collision load equal to or greater than a predetermined value is applied to the fuel tank from the outside in the vehicle front-rear direction.

The vehicle according to aspects of the disclosure may further include a supporting unit that supports the first end portion of the fuel tank in the vehicle width direction with respect to a vehicle body. The supporting unit may have a rotating mechanism that horizontally rotates the fuel tank around the first end portion of the fuel tank.

According to aspects of the disclosure, the fuel tank can be easily horizontally rotated around the first end portion of the fuel tank by the rotating mechanism when a collision load equal to or greater than a predetermined value is applied to the fuel tank from the outside in the vehicle front-rear direction.

In the vehicle according to aspects of the disclosure, the rotating mechanism of the supporting unit may include a ring member attached to the first end portion of the fuel tank; an outer tube extending in an upward-downward direction of the vehicle; an arm connecting the ring member and the outer tube together; a shaft member inserted through the outer tube; an attachment member that supports the shaft member in a non-rotatable manner and is attached to the vehicle body; and an elastic (e.g., rubber) body that connects an inner peripheral surface of the outer tube and an outer peripheral surface of the shaft member together.

In the vehicle according to aspects of the disclosure, the electrical device may be at least one of a motor drive unit in which a motor serving as a driving source and a mechanism for transmitting the driving force of the motor to a vehicle axle are accommodated in a case, a battery unit, a power control unit for motor control, and a fuel cell.

When the electrical device is the motor drive unit, for example, the motor corresponds to the high-voltage part. Additionally, when the electrical device is the battery unit, for example, a battery corresponds to the high-voltage part, and a battery case corresponds to the case. Moreover, when the electrical device is the power control unit, for example, a converter or an inverter corresponds to the high-voltage part. Additionally, when the electrical device is the fuel cell, for example, a cell stack corresponds to the high-voltage part.

As described above, according to the vehicle related to aspects of the disclosure, exposure of the high-voltage part during and after a front collision or a rear collision can be limited or even suppressed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, embodiments for carrying out the disclosure will be described with reference to the drawings. Black arrows of FIG. 1, FIG. 4, and FIGS. 5, 7, and 8 indicate a vehicle front.

Throughout the disclosure, unless otherwise specified, references to "right" and "left" sides shall be interpreted to be in reference to the right and left sides of the vehicle in which embodiments of the present disclosure are implemented (i.e., along a lateral axis of the vehicle in a vehicle width direction).

Further, throughout the disclosure, unless otherwise specified, references to "front" and "rear" sides shall be interpreted to be in reference to the front and rear sides of the vehicle in which embodiments of the present disclosure are implemented (i.e., along a longitudinal axis of the vehicle in a vehicle front-rear direction).

Embodiment 1

Overall Configuration

Figure 1:
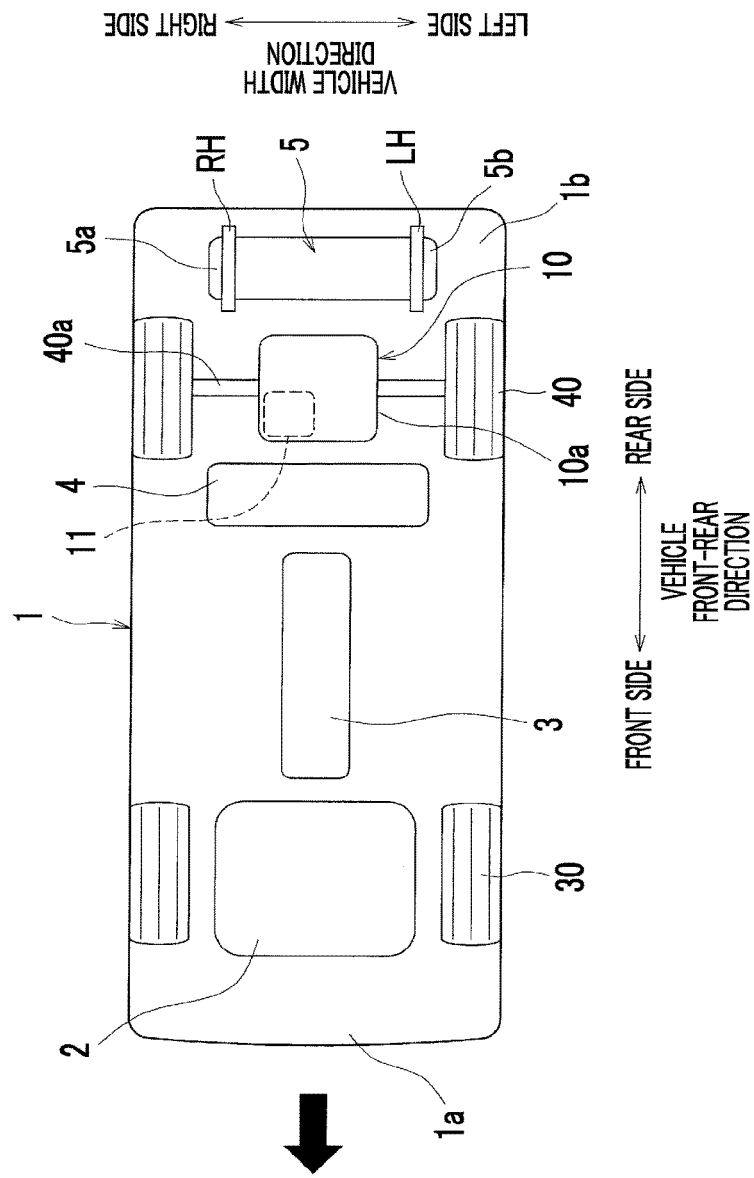
FIG. 1 is a view schematically illustrating a fuel cell vehicle related to Embodiment 1 of the disclosure.

FIG. 1 is a schematic view illustrating a fuel cell vehicle 1 related to the present embodiment. The fuel cell vehicle 1 is a rear wheel drive fuel cell vehicle, and as illustrated in FIG. 1, the fuel cell vehicle 1 includes a fuel cell stack 2 disposed at a vehicle front portion 1a, first to third hydrogen tanks 3, 4, 5 serving as fuel tanks that store the fuel (e.g., gaseous fuel) to be supplied to the fuel cell stack 2, a transaxle 10 disposed at a vehicle rear portion 1b, front wheels 30 serving as driven wheels, and rear wheels 40 serving as driving wheels.

The fuel cell stack (fuel cell) 2 is accommodated within an accommodating chamber that is partitioned from a vehicle cabin by a dash panel (not illustrated) and provided at the vehicle front portion 1a. The fuel cell stack 2 is a power generation device that generates electrical energy that drives the fuel cell vehicle 1 using a chemical reaction of the hydrogen supplied from the first to third hydrogen tanks 3, 4, 5, and oxygen in the air. The fuel cell stack 2 is formed by stacking a plurality of cells in which an electrode complex obtained by coating both surfaces of a solid polymer electrolyte membrane with a hydrogen electrode catalyst and an oxygen electrode catalyst, respectively, is sandwiched in between separators.

The fuel cell stack 2 is electrically connected to an electric motor 11 (to be described below) via a DC/DC converter (not illustrated) and an inverter (not illustrated). Accordingly, after the voltage from the fuel cell stack 2 is increased (i.e., stepped up) by the DC/DC converter, a direct current from the DC/DC converter is changed into an alternating current by the inverter, and is supplied to the electric motor 11.

Generally, in order to extend the range of the fuel cell vehicle (i.e., the maximum distance at which the fuel cell vehicle can travel on a single refueling or the like), there is a need for loading more fuel (e.g., gaseous fuel) into the fuel cell vehicle. However, when relatively large fuel tanks are mounted, effective use of vehicle space is hindered. For this reason, in the fuel cell vehicle 1 of the present embodiment, three relatively small hydrogen tanks are mounted in three separate locations. Specifically, the fuel cell vehicle 1 includes a first hydrogen tank 3 disposed so as to extend at a vehicle central portion in a vehicle front-rear direction, a second hydrogen tank 4 disposed in front of (inward of) the transaxle 10 so as to extend in a vehicle width direction, and a third hydrogen tank 5 disposed behind (outward of) the transaxle 10 so as to extend in the vehicle width direction. The first to third hydrogen tanks 3, 4, 5 are fluidly connected to each other by, for example, pipelines (not illustrated), and are configured to supply the hydrogen filled into the first to third hydrogen tanks 3, 4, 5 to the fuel cell stack 2.

The first to third hydrogen tanks 3, 4, 5 comprise high-strength components (for example, including an inner wall layer formed of metal, hard resin, or the like and an outer wall layer formed by wrapping several times with fiber-reinforced plastics or the like), and have high rigidity such that the tanks are not easily deformed due to internal pressure or an external force applied during a vehicle collision. The first and second hydrogen tanks 3, 4 among the first to third hydrogen tanks 3, 4, 5, are suspended from a vehicle body via, for example, a supporting band (not illustrated). Additionally, the third hydrogen tank 5 has a first end portion 5a on the right side and a second end portion 5b on the left side, and the first end portion 5a and the second end portion 5b are respectively supported by a first supporting portion RH and a second supporting portion LH with respect to the vehicle body.

Figure 2:
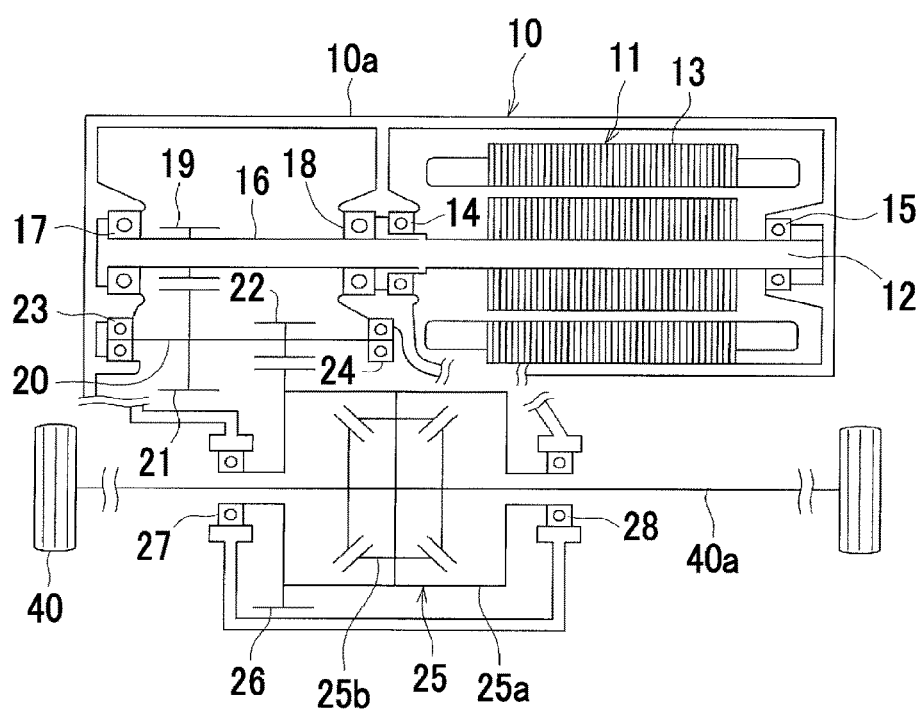
FIG. 2 is a skeleton view describing a schematic configuration of a transaxle.

FIG. 2 is a skeleton view describing a schematic configuration of the transaxle 10. As illustrated in FIG. 2, the transaxle (motor drive unit) 10 includes the electric motor 11 serving as a driving source, a first reduction gear pair 19, 21, a second reduction gear pair 22, 26, and a differential gear mechanism 25. The transaxle 10 includes a case 10a made of die cast aluminum. The case 10a accommodating the electric motor 11, the first reduction gear pair 19, 21, the second reduction gear pair 22, 26, and the differential gear mechanism 25. As illustrated in FIG. 1, the transaxle 10 is disposed at the vehicle rear portion 1b at least partially overlap rear wheel vehicle axles 40a, and is configured to transmit a driving force generated in the electric motor 11 to the rear wheel vehicle axles 40a via the first reduction gear pair 19, 21, the second reduction gear pair 22, 26, and the differential gear mechanism 25.

The electric motor 11 has a rotor shaft 12, and a stator 13 fixed to the transaxle case 10a, so as to surround an outer periphery of the rotor shaft 12. The rotor shaft 12 is rotatably supported by the transaxle case 10a via a pair of bearings 14, 15 mounted on both ends of the rotor shaft 12. An output shaft 16 connected to the rotor shaft 12 is rotatably supported by the transaxle case 10a via a pair of bearings 17, 18 mounted on both ends of the output shaft 16, and rotates integrally with the rotor shaft 12. In addition, the electric motor 11 is disposed at a position near the front side and near a first side end on the right side, as illustrated by a dashed line in FIG. 1, within the transaxle case 10a.

The first reduction gear pair 19, 21 comprises a smaller-diameter counter drive gear 19 that is provided at a first end portion (an end portion opposite to the electric motor 11) of the output shaft 16, and a larger-diameter counter driven gear 21 that is provided at a first end portion (an end portion opposite to the electric motor 11) of a counter shaft 20 parallel to the output shaft 16 and meshes with the counter drive gear 19. In addition, the counter shaft 20 is rotatably supported by the transaxle case 10a via a pair of bearings 23, 24 mounted on both ends of the counter shaft 20.

The second reduction gear pair 22, 26 comprises a smaller-diameter final drive gear 22 that is provided at the second end portion (an end portion on the electric motor 11 side) of the counter shaft 20, and a larger-diameter final driven gear 26 that is integrally fixed to an outer peripheral portion of a differential case 25a and meshes with the final drive gear 22. The differential case 25a and the final driven gear 26 integrally fixed to the differential case 25a are rotatably supported by the transaxle case 10a via a pair of bearings 27, 28 mounted on both end portions of the differential case 25a in an axial direction.

The differential gear mechanism 25 has the differential case 25a, and a so-called bevel gear type differential mechanism 25b accommodated within the differential case 25a, and is configured to transmit a driving force to a pair of rear wheel vehicle axles 40a while allowing a rotating speed difference.

In the fuel cell vehicle 1 configured as described above, the fuel cell stack 2 generates electric power by hydrogen being supplied from the first to third hydrogen tanks 3, 4, 5, the electric motor 11 is driven by the electrical energy from the fuel cell stack 2, and the driving force generated in the electric motor 11 is transmitted to the differential gear mechanism 25 via the first reduction gear pair 19, 21, the second reduction gear pair 22, 26, and is transmitted from the differential gear mechanism 25 via the rear wheel vehicle axles 40a to the rear wheels 40.

Supporting Structure of Hydrogen Tank

Meanwhile, in a fuel cell vehicle in which a hydrogen tank is disposed on the rear side of the transaxle, a collision load can be received by the hydrogen tank comprising a high-strength component before being received by the transaxle during a rear collision. However, it is possible that the transaxle (for example, the transaxle case) may be damaged because the hydrogen tank that has moved to the front side due to the collision contacts the transaxle.

In this way, for example, when the transaxle case is damaged, it is possible that a high-voltage part (for example, an electric motor or the like) within the transaxle that should originally be protected with a coating or a cover in order to restrain an electric shock or the like is exposed. A state where the high-voltage part can be touched may occur, or there is a case where the exposed high-voltage part may be damaged by contacting a peripheral component.

In the present embodiment, the displacement of the third hydrogen tank 5 during a rear collision is controlled so that the third hydrogen tank 5 does not contact a peripheral part of the electric motor 11 in the transaxle 10. Specifically, in the fuel cell vehicle 1 of the present embodiment, when the electric motor 11 is disposed near the first side end on the right side within the transaxle case 10a, and a collision load equal to or more than a predetermined value is applied from the rear side (outside), the third hydrogen tank 5 is horizontally rotated about the first end portion 5a on the right side, and the second end portion 5b of the third hydrogen tank 5 on the left side is caused to contact a second side end of the transaxle 10 on the left side.

That is, in the present embodiment, when a collision load equal to or greater than a predetermined value is applied from the rear side (outside), the third hydrogen tank 5 is horizontally rotated about the end portion 5a near the electric motor 11 (i.e., a high-voltage part), and the third hydrogen tank 5 is caused to contact a part of the transaxle 10 located away from the electric motor 11. Accordingly, at least the peripheral part of the electric motor 11 is further restrained from being damaged, and thus, the electric motor 11 is not exposed.

Hereinafter, an example in which the third hydrogen tank 5 is horizontally rotated about the first end portion 5a on the right side when a collision load equal to or greater than a predetermined value is applied from the rear side will be described.

Figure 3A:
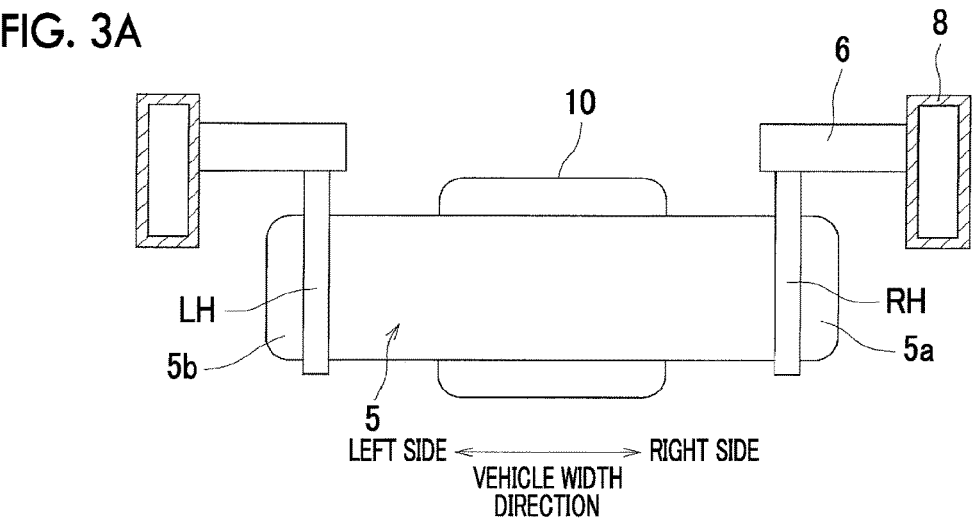
FIG. 3A is a view schematically illustrating a supporting structure of a hydrogen tank.

FIG. 3A is a view schematically illustrating a supporting structure of the third hydrogen tank 5. As illustrated in FIG. 3A, the third hydrogen tank 5 is connected to brackets 6 on the right side and the left side via the first supporting portion RH and the second supporting portion LH on the rear side of the transaxle 10. The brackets 6 are respectively connected to a pair of rear side members (vehicle body) 8 extending in the vehicle front-rear direction at the first end portion and the second end portion 5a, 5b, respectively, in the vehicle width direction. Therefore, the third hydrogen tank 5 is supported by the vehicle body 8 via the first supporting portion RH, the second supporting portion LH, and the brackets 6 on the rear side of the transaxle 10.

The first supporting portion RH, which supports the first end portion 5a of the third hydrogen tank 5 on the right side, comprises a supporting band connected to the bracket 6 on the right side. Additionally, the second supporting portion LH, which supports the second end portion 5b of the third hydrogen tank 5 on the left side, also comprises a supporting band connected to the bracket 6 on the left side. As described above, the suspended supporting structure by the supporting bands is adopted. Accordingly, even when the third hydrogen tank 5 is slightly deformed (expanded or contracted) due to heat or the like, deformation of the third hydrogen tank 5 can be compensated for by the supporting bands. Thus, it is possible to stably support the third hydrogen tank 5. Additionally, by adopting the suspended supporting structure by the supporting bands, it is possible to allow a certain amount of displacement of the third hydrogen tank 5 accompanying the vibration of the vehicle body, unlike when the third hydrogen tank 5 is firmly fixed to the vehicle body with bolts (not illustrated) or the like.

In this way, the first supporting portion RH is configured to be stronger (i.e., harder to break) than the second supporting portion LH with respect to a collision load. In more detail, when a collision load equal to or greater than a predetermined value is applied to the third hydrogen tank 5 during a rear collision, the first supporting portion RH should not break, whereas the second supporting portion LH is configured to break and the third hydrogen tank 5 is supported solely by the first supporting portion RH. Accordingly, the third hydrogen tank 5 is horizontally rotated about the first end portion 5a on the right side.

Figure 3B:
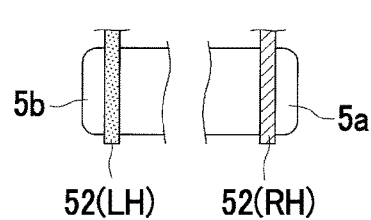
FIG. 3B is a view schematically illustrating a supporting structure of the hydrogen tank.
Figure 3D:
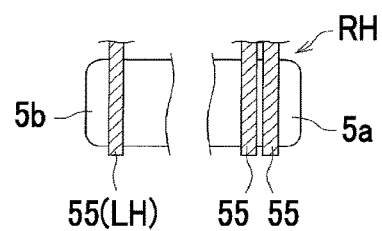
FIG. 3D is a view schematically illustrating a supporting structure of the hydrogen tank.
Figure 3C:
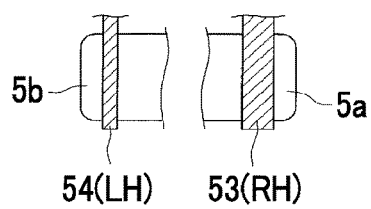
FIG. 3C is a view schematically illustrating a supporting structure of the hydrogen tank.

As described above, the first supporting portion RH being stronger than the second supporting portion LH with respect to a collision load can be realized by forming the supporting band 51 of the first supporting portion RH and the supporting band 52 of the second supporting portion LH with different materials, as illustrated in FIG. 3B, for example, when the shapes or sizes of the supporting band of the first supporting portion RH and the supporting band of the second supporting portion LH are the same. FIG. 3B to FIG. 3D illustrate that the materials differ by using different hatching.

More specifically, the first supporting portion RH can be made stronger than the second supporting portion LH with respect to a collision load by forming the supporting band 51 of the first supporting portion RH with a material having a yield strength higher than the yield strength of the supporting band 52 of the second supporting portion LH. In the above-described case, for example, a collision load (predetermined value), which displaces the third hydrogen tank 5 to the front side as the third hydrogen tank 5 contacts transaxle 10, may be assumed based on experiment, simulation, or the like. Then, a material having a yield strength such that the supporting band 51 does not break may be selected based on the assumed collision load, the cross-sectional area of the supporting bands 51, 52, and the like, and a material having a yield strength such that the supporting band 52 breaks under the load may be selected for the supporting band 52.

Additionally, for example, when supporting bands having the same material (yield strength) are used as the first supporting portion RH and the second supporting portion LH, the first supporting portion RH can be made stronger than the second supporting portion LH with respect to a collision load by forming the first supporting portion RH with a supporting band 53 wider (having a larger cross-sectional area) than a supporting band 54 of the second supporting portion LH, as illustrated in FIG. 3C.

Moreover, for example, when supporting bands 55 having the same shape, size, and material (yield strength) are used as the first supporting portion RH and the second supporting portion LH, the first supporting portion RH can be made stronger than the second supporting portion LH with respect to a collision load by forming the first supporting portion RH with additional (e.g., two or more) supporting bands 55, and forming the second supporting portion LH with only one supporting band 55, as illustrated in FIG. 3D.

Figure 4:
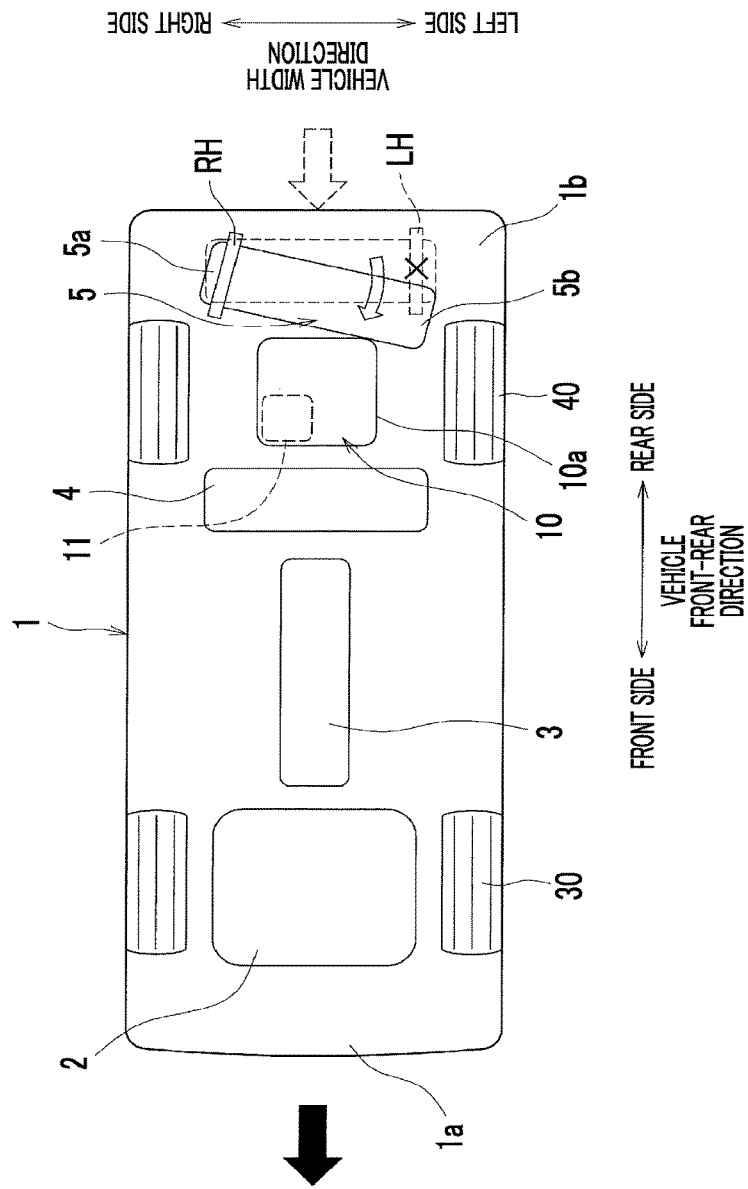
FIG. 4 is a view schematically illustrating the displacement of the hydrogen tank at the time of a rear collision.

By virtue of the above configuration, during a rear collision as indicated by a dashed line arrow of FIG. 4, the third hydrogen tank 5 made of the high-strength component receives a collision load before the transaxle 10. Therefore, exposure of the electric motor 11 (i.e., a high-voltage part) can be reduced or prevented by further limiting damage to the transaxle 10 due to a relatively large collision load during early stages of a collision.

Moreover, when a collision load equal to or greater than a predetermined value is applied to the third hydrogen tank 5, the supporting bands 52, 54, 55(LH) break and the connection between the second supporting portion LH and the third hydrogen tank 5 is released (refer to mark X of FIG. 4). However, because the first supporting portion RH, in which the supporting bands 51, 53, 55(RH) are left without breaking, supports the first end portion 5a on the right side of the third hydrogen tank 5, while allowing displacement of the fuel tank, as indicated by a white arrow of FIG. 4, the third hydrogen tank 5 is horizontally rotated in the clockwise direction about the first end portion 5a on the right side. As described above, when the third hydrogen tank 5 is horizontally rotated in the clockwise direction about the first end portion 5a on the right side, the second end portion 5b of the third hydrogen tank 5 on the left side contacts a part of the transaxle 10 on the left side, and the impact during a rear collision can be absorbed. Here, since the electric motor 11 is disposed near the right side within the transaxle case 10a, even when a part of the transaxle case 10a on the left side is damaged, exposure of the electric motor 11 (i.e., a high-voltage part) can be reduced or suppressed.

In relation to the claims, the transaxle 10 in which the electric motor 11 serving as a high-voltage part and a mechanism for transmitting the driving force of the electric motor 11 to the vehicle axles are accommodated in the transaxle case 10a is an example of an "electrical device in which a high-voltage part is accommodated in the case".

Embodiment 2

The present embodiment is different from Embodiment 1 in that the second hydrogen tank 4 and the third hydrogen tank 5 are coupled together via a bracing member. Hereinafter, different points from Embodiment 1 will mainly be described.

Figure 5:
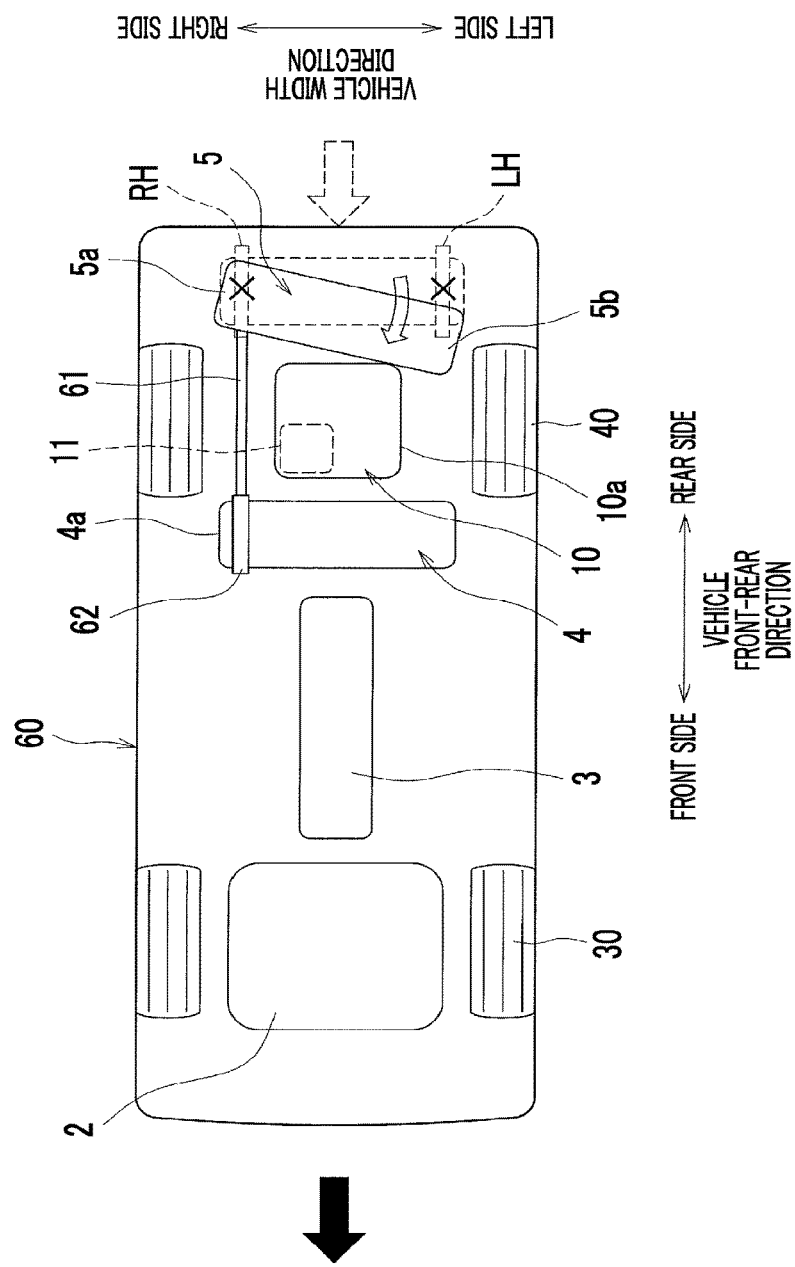
FIG. 5 is a view schematically illustrating a fuel cell vehicle related to Embodiment 2.

FIG. 5 is a view schematically illustrating a fuel cell vehicle 60 related to the present embodiment. As illustrated in FIG. 5, the first end portion 5a of the third hydrogen tank 5 on the right side is coupled via a bracing member 61 to an end portion 4a, on the right side, of the second hydrogen tank (peripheral component) 4 disposed in front of (inward of) the third hydrogen tank 5.

When a collision load equal to or greater than a predetermined value is applied to the third hydrogen tank 5 during a rear collision, bracing member 61 may transmit at least a portion of the collision load to second hydrogen tank 4 without buckling. With this in mind, the shape of the bracing member 61 is not particularly limited, and for example, may be a rod shape or a hollow box shape such that bracing member 61 has sufficient strength such that the collision load can be transmitted to the second hydrogen tank 4 without buckling.

Additionally, aspects of coupling between the bracing member 61, and the second hydrogen tank 4 and the third hydrogen tank 5 are not particularly limited when the bracing member 61 functions as a "barrier" between the second hydrogen tank 4 and the third hydrogen tank 5 during a rear collision and the horizontal rotation of the third hydrogen tank 5 is not hindered. For example, as illustrated in FIG. 5, a front end portion of the bracing member 61 may be firmly fixed to a ring member 62 wound around the end portion 4a of the second hydrogen tank 4 on the right side, and rear end portion of the bracing member 61 may be applied to the first end portion 5a of the third hydrogen tank 5 on the right side, or the first end portion 5a of the third hydrogen tank 5 on the right side, and the rear end portion of the bracing member 61 may also be connected together via a hinge (not illustrated).

Moreover, the first supporting portion RH and the second supporting portion LH that support both end portions of the third hydrogen tank 5, respectively, may comprise, for example, vibration-proof mounts having supporting bands or elastic (e.g., rubber) bodies. In such a case, when a collision load equal to or greater than a predetermined value is applied to the third hydrogen tank 5 during a rear collision, only the second supporting portion LH that supports the second end portion 5b of the third hydrogen tank 5 on the left side may be broken, or both the first supporting portion RH and the second supporting portion LH that support the first end portion and the second end portion 5a, 5b of the third hydrogen tank 5 may be broken.

By virtue of this configuration, during a rear collision, as indicated by a dashed line arrow of FIG. 5, for example, even when both the first supporting portion RH and the second supporting portion LH break as illustrated by marks X of FIG. 5, the first end portion 5a of the third hydrogen tank 5 on the right side is not displaced because the bracing member 61 functions as a barrier, whereas the second end portion 5b of the third hydrogen tank 5 on the left side, which is a free end, is displaced to the front side. Accordingly, as indicated by a white arrow of FIG. 5, the impact during a rear collision can be absorbed by horizontally rotating the third hydrogen tank 5 in the clockwise direction about the first end portion 5a on the right side to cause the second end portion 5b of the third hydrogen tank 5 on the left side contact the part of the transaxle 10 on the left side. Additionally, exposure of the electric motor 11 (i.e., a high-voltage part) can be reduced or prevented by further limiting the damage of the peripheral part of the electric motor 11 in the transaxle 10.

In relation to the claims, the second hydrogen tank 4 disposed on the front side of the transaxle 10 is an example of "the peripheral component of the electrical device".

Embodiment 3

The present embodiment is different from Embodiment 1 in that the first supporting portion RH includes a rotating mechanism. Hereinafter, different points from Embodiment 1 will mainly be described.

Figure 6:
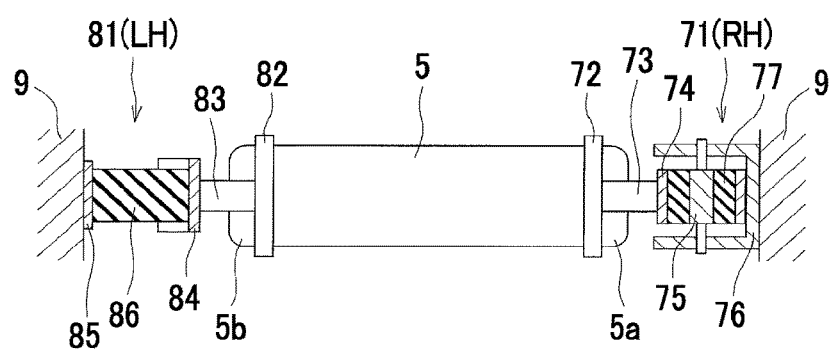
FIG. 6 is a view schematically illustrating a supporting structure of a hydrogen tank related to Embodiment 3.
Figure 7:
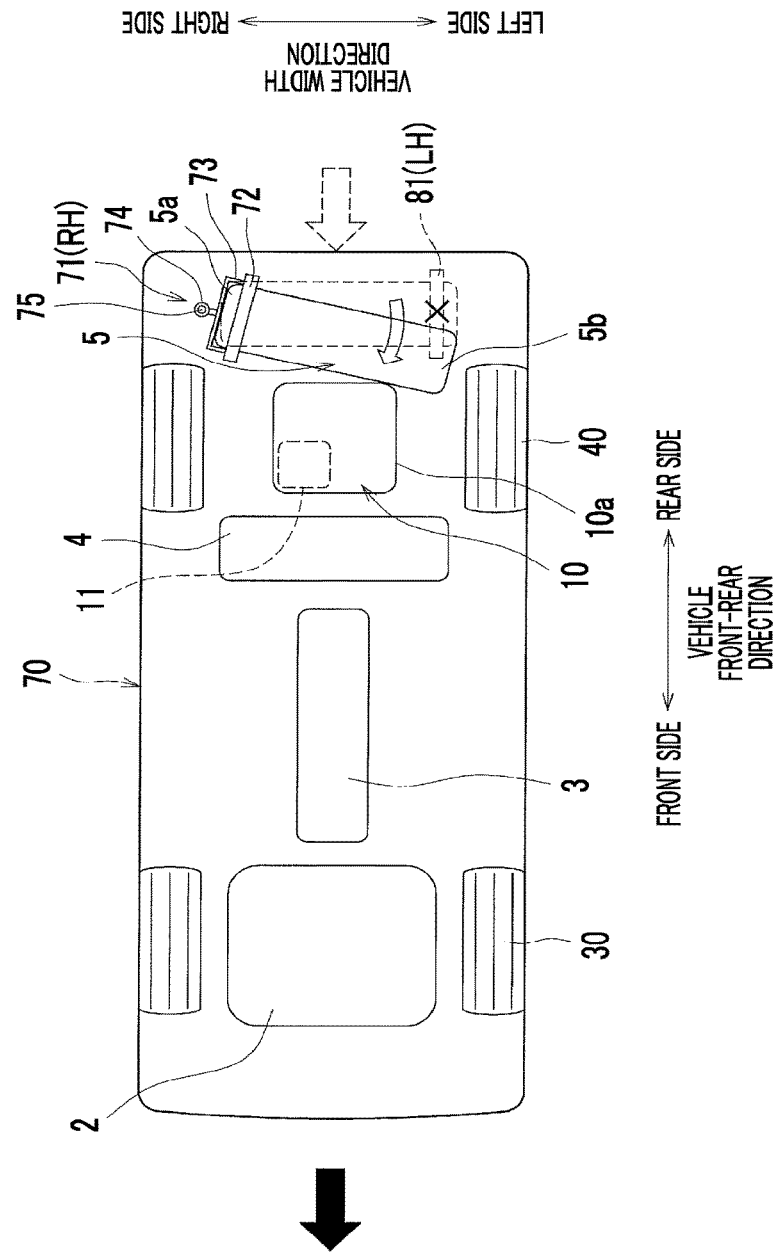
FIG. 7 is a view schematically illustrating a fuel cell vehicle related to Embodiment 3.

FIG. 6 is a view schematically illustrating a supporting structure of the third hydrogen tank 5, and FIG. 7 is a view schematically illustrating a fuel cell vehicle 70. In addition, in FIG. 6, for the convenience of description, the vibration-proof mounts 71, 81 are illustrated in a sectional view.

In the fuel cell vehicle 70, as illustrated in FIG. 6, the first supporting portion RH comprising the vibration-proof mount 71 connects the first end portion 5a of the third hydrogen tank 5 on the right side with the vehicle body 9, and the second supporting portion LH comprising the vibration-proof mount 81 connects the second end portion 5b of the third hydrogen tank 5 on the left side with the vehicle body 9.

The vibration-proof mount 71 includes a ring member 72 wound around the first end portion 5a of the third hydrogen tank 5 on the right side. An outer tube 74 that extends in an upward-downward direction, an arm 73 that connects the ring member 72 with the outer tube 74, a shaft member 75 inserted through the outer tube 74, and an attachment member 76 that supports the shaft member 75 in a non-rotatable manner, is attached to the vehicle body 9, and has a substantially C-shaped section. An elastic (e.g., rubber) body 77 that connects an inner peripheral surface of the outer tube 74 with an outer peripheral surface of the shaft member 75 is also provided.

Meanwhile, the vibration-proof mount 81 includes a ring member 82 wound around the second end portion 5b of the third hydrogen tank 5 on the left side, a first plate 84, an arm 83 that connects the ring member 82 and the plate 84 together, a second plate 85 attached to the vehicle body 9, and an elastic (e.g., rubber) body 86 that connects the first plate 84 with the second plate 85.

In this way, effective sectional area and tear strength with respect to a tensile load and a shearing load, respectively, are set such that the elastic (e.g., rubber) bodies 77, 86 of both the vibration-proof mounts 71, 81 break when a collision load equal to or greater than a predetermined value is applied to the third hydrogen tank 5 during a rear collision.

By virtue of the above configuration, when a collision load equal to or greater than a predetermined value is applied to the transaxle 10 during a rear collision as indicated by a dashed line arrow of FIG. 7, the elastic (e.g., rubber) body 86 breaks, and the connection between the second supporting portion LH and the third hydrogen tank 5 is released, as illustrated by mark X of FIG. 7. Meanwhile, in the first supporting portion RH, even when the elastic (e.g., rubber) body 77 breaks, a structure is left in which the outer tube 74 connected to the third hydrogen tank 5 via the ring member 72 and the arm 73 is rotatable about the shaft member 75 attached to the vehicle body 9 side in a non-rotatable manner. That is, in the first supporting portion RH, the shaft member 75 that extends up and down, and the outer tube 74 that rotates around the shaft member 75 constitute the rotating mechanism that supports the third hydrogen tank 5 in a horizontally rotatable manner with respect to the vehicle body 9 even when the elastic (e.g., rubber) body 77 breaks. Thus, the third hydrogen tank 5 can be horizontally rotated in the clockwise direction about the right side. Accordingly, the impact during a rear collision can be absorbed by causing the second end portion 5b of the third hydrogen tank 5 on the left side contact the part of the transaxle 10 on the left side. Additionally, exposure of the electric motor 11 (i.e., a high-voltage part) can be reduced or prevented by further limiting the damage of the peripheral part of the electric motor 11 in the transaxle 10.

Other Embodiments

The present disclosure is not limited to the embodiments described, and can be carried out in other various ways without deviating from the scope of the claims.

Embodiments of the disclosure are described as applied to fuel cell vehicles 1, 60, 70. However, embodiments of the disclosure may be applied to, for example, a hydrogen car or the like.

Embodiments of the disclosure are applied to a case where the electrical device is the transaxle 10. However, embodiments of the disclosure may be applied where the electrical device is a battery unit, the case of a power control unit, and the case of the fuel cell stack 2. Additionally, embodiments of the disclosure are applied to a rear collision when the electrical device is disposed at the vehicle rear portion. However, embodiments of the present disclosure are not limited to this case and may be applied to a front collision when the transaxle 10, the battery unit, the power control unit, or the fuel cell stack 2 is disposed at the vehicle front portion.

Figure 8:
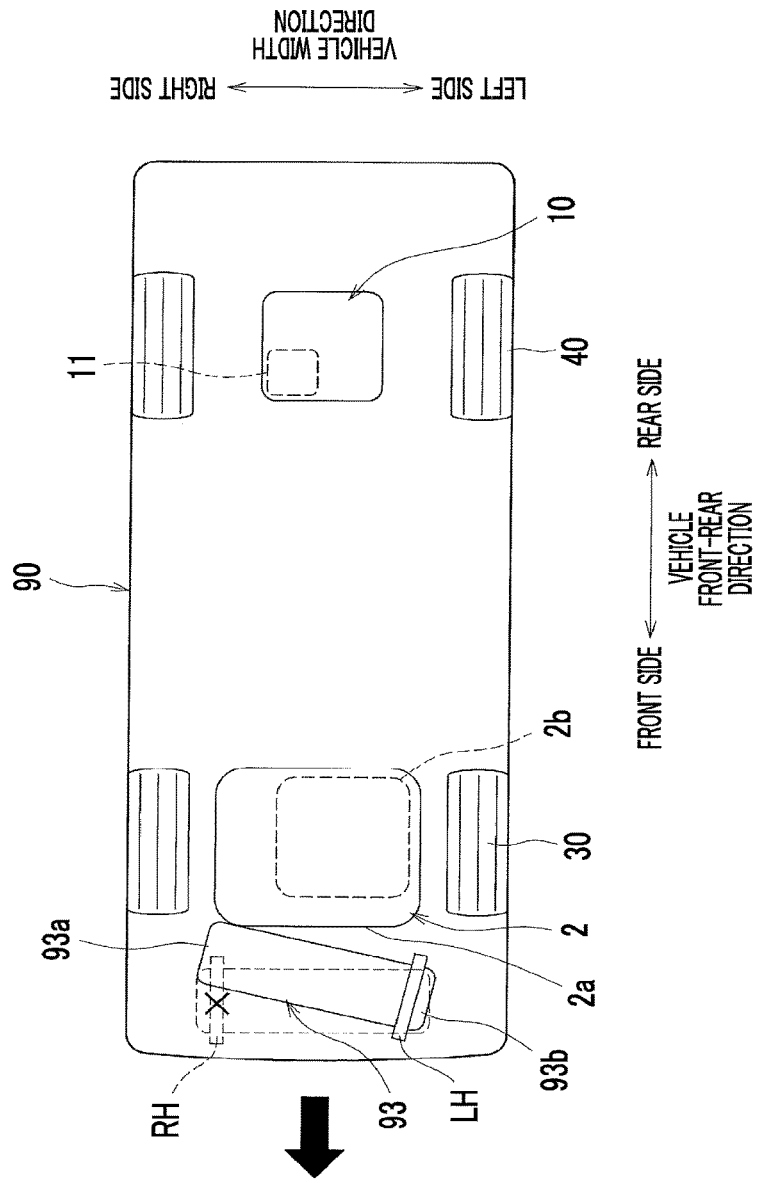
FIG. 8 is a view schematically illustrating the appearance of a vehicle related to another embodiment at the time of a front collision.

For example, as illustrated in FIG. 8, in a fuel cell vehicle 90 in which the fuel cell stack 2 is disposed at the vehicle front portion and is disposed on the front side of the fuel cell stack 2 such that a hydrogen tank 93 extends in the vehicle width direction, when a cell stack (high-voltage part) 2b is disposed on the left side within a case 2a and a collision load equal to or greater than a predetermined value is applied from the front side, the hydrogen tank 93 may be horizontally rotated about the first end portion 93b on the left side. Thereby, a second end portion 93a of the hydrogen tank 93 on the right side may be caused to contact the right side of the fuel cell stack 2.

In the respective embodiments, the first supporting portion RH, the second supporting portion LH, the bracing member 61, and the rotating mechanism are disposed such that the third hydrogen tank 5 is horizontally rotated in the clockwise direction about the first end portion 5a on the right side. However, this configuration is not intended to be limiting, and the first supporting portion RH, the second supporting portion LH, the bracing member 61, and the rotating mechanism may be disposed such that the third hydrogen tank 5 is horizontally rotated in the counterclockwise direction about the second end portion 5b on the left side.

In Embodiment 1, the first supporting portion RH and the second supporting portion LH comprise the supporting bands. However, embodiments of the disclosure are not limited to the supporting bands as long as the first supporting portion RH does not break and the second supporting portion LH breaks when a collision load equal to or greater than a predetermined value is applied to the third hydrogen tank 5 during a rear collision. For example, the first supporting portion RH and the second supporting portion LH may comprise the vibration-proof mounts having the elastic (e.g., rubber) bodies.

In Embodiment 2, the second hydrogen tank 4 and the third hydrogen tank are coupled together via the bracing member 61. However, as long as a peripheral member, which is disposed in front of (inward of) the third hydrogen tank 5 and which has rigidity equal to or greater than the third hydrogen tank 5, is provided, embodiments of the disclosure are not limited to this configuration. For example, the peripheral member other than the second hydrogen tank 4 and the third hydrogen tank 5 may be coupled together.

Embodiments of the disclosure are applied to the fuel cell vehicle 1 including the fuel cell stack 2 that generates electric power using a chemical reaction of hydrogen and oxygen. However, embodiments of the disclosure are not limited to the fuel cell vehicle 1, and aspects of the disclosure may be applied to a fuel cell vehicle including fuel cells that generate electric power using a chemical reaction of fuel (e.g., gaseous fuel) other than hydrogen and oxidizer gas other than oxygen.

As described above, the embodiments are merely illustrative in all respects, and should not be interpreted restrictively. Moreover, all modifications or alternations belonging to the equivalent scope of the claims are within the scope of the disclosure.

According to aspects of the disclosure, the exposure of the high-voltage part at the time of a front collision or a rear collision can be further reduced or prevented. Thus, embodiments of the disclosure may be desirable when applied to a vehicle in which the electrical device in which the high-voltage part is accommodated in the case is disposed at the vehicle front portion or the vehicle rear portion and a fuel tank is disposed outward of the electrical device in the vehicle front-rear direction, among others.

What is claimed is:

1. A vehicle comprising:
an electrical device including a high-voltage part accommodated in a case, the electrical device being at a vehicle front portion or a vehicle rear portion, and the case having a first side end in a vehicle width direction and a second side end opposite to the first side end; and
a fuel tank in which fuel gas is stored, the fuel tank being outward of the electrical device in a vehicle front-rear direction, the fuel tank extending in the vehicle width direction, wherein:
the high-voltage part is at the first side end of the case in the vehicle width direction within the case;
the fuel tank has a first end portion in the vehicle width direction and a second end portion opposite to the first end portion; and
when a collision load equal to or more than a predetermined value is applied to the fuel tank from outside in the vehicle front-rear direction, the fuel tank is configured to be horizontally rotated around the first end portion of the fuel tank in the vehicle width direction, and the second end portion of the fuel tank in the vehicle width direction is configured to abut against the second side end of the electrical device in the vehicle width direction.

2. The vehicle according to claim 1, further comprising:
a first supporting portion and a second supporting portion respectively at the first end portion and at the second end portion of the fuel tank in the vehicle width direction, the first supporting portion and the second supporting portion being configured to support the fuel tank with respect to a vehicle body,
wherein the first supporting portion that supports the first end portion of the fuel tank in the vehicle width direction is configured to be harder to break than the second supporting portion that supports the second end portion of the fuel tank in the vehicle width direction with respect to the collision load.

3. The vehicle according to claim 2, further comprising:
a pair of rear side members extending in the vehicle front-rear direction at both end portions of the vehicle in the vehicle width direction; and
a pair of brackets connected to the rear side members, respectively,
wherein the first supporting portion and the second supporting portion are supporting bands, each supporting band having an upper end coupled to a corresponding bracket out of the brackets and a lower end coupled to the fuel tank.

4. The vehicle according to claim 1, further comprising:
a bracing member that couples the first end portion of the fuel tank in the vehicle width direction and a peripheral component disposed inward of the fuel tank in the vehicle front-rear direction together.

5. The vehicle according to claim 1, further comprising:
a supporting unit that supports the first end portion of the fuel tank in the vehicle width direction with respect to a vehicle body,
wherein the supporting unit has a rotating mechanism that horizontally rotates the fuel tank around the first end portion of the fuel tank.

6. The vehicle according to claim 5, wherein the rotating mechanism of the supporting unit includes
a ring member attached to the first end portion of the fuel tank,
an outer tube extending in an upward-downward direction of the vehicle,
an arm connecting the ring member and the outer tube together,
a shaft member inserted through the outer tube, an attachment member that supports the shaft member in a non-rotatable manner and is attached to the vehicle body, and a rubber elastic body that connects an inner peripheral surface of the outer tube and an outer peripheral surface of the shaft member together.

7. The vehicle according to claim 1, wherein the electrical device is at least one of a motor drive unit in which a motor serving as a driving source and a mechanism for transmitting a driving force of the motor to a vehicle axle are accommodated in the case, a battery unit, a power control unit for motor control, and a fuel cell.

8. The vehicle according to claim 1, wherein the electric device is at the vehicle front portion and the fuel tank is forward of the vehicle front portion in the vehicle front-rear direction.

9. The vehicle according to claim 1, wherein the electric device is at the vehicle rear portion and the fuel tank is rearward of the vehicle front portion in the vehicle front-rear direction.

10. The vehicle according to claim 2, wherein the first supporting portion has a yield strength higher than a yield strength of the second supporting portion.

11. The vehicle according to claim 2, wherein the first supporting portion has an effective sectional area greater than an effective sectional area of the second supporting portion.

* * * * *